US008984148B2

(12) United States Patent
Polk et al.

(10) Patent No.: US 8,984,148 B2
(45) Date of Patent: Mar. 17, 2015

(54) METHOD AND APPARATUS FOR SIGNALING POST-RING RESERVATIONS

(75) Inventors: James M. Polk, Colleyville, TX (US); Paul E. Jones, Apex, NC (US); Subhasri Dhesikan, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 229 days.

(21) Appl. No.: 13/555,450

(22) Filed: Jul. 23, 2012

(65) Prior Publication Data

US 2014/0025831 A1   Jan. 23, 2014

(51) Int. Cl.
*G06F 15/16* (2006.01)
*H04L 12/28* (2006.01)
*H04L 29/06* (2006.01)
*H04M 3/51* (2006.01)
*H04M 7/12* (2006.01)

(52) U.S. Cl.
CPC ........ *H04L 65/1069* (2013.01); *H04L 65/1006* (2013.01); *H04M 3/51* (2013.01); *H04M 7/127* (2013.01)
USPC ........................ 709/228; 709/237; 370/395.21

(58) Field of Classification Search
None
See application file for complete search history.

(56) References Cited

U.S. PATENT DOCUMENTS

| | | | | |
|---|---|---|---|---|
| 5,600,645 A | * | 2/1997 | Boyer et al. | 370/395.4 |
| 5,918,022 A | * | 6/1999 | Batz et al. | 709/236 |
| 6,286,052 B1 | * | 9/2001 | McCloghrie et al. | 709/238 |
| 6,366,577 B1 | * | 4/2002 | Donovan | 370/352 |
| 6,434,624 B1 | * | 8/2002 | Gai et al. | 709/232 |
| 6,721,272 B1 | * | 4/2004 | Parnafes et al. | 370/235 |
| 8,619,564 B2 | | 12/2013 | Polk et al. | |
| 2002/0112246 A1 | * | 8/2002 | Mueller et al. | 725/106 |
| 2003/0035401 A1 | * | 2/2003 | Shaheen et al. | 370/341 |
| 2003/0110283 A1 | * | 6/2003 | Lee | 709/233 |
| 2003/0133459 A1 | * | 7/2003 | Siddiqui et al. | 370/395.21 |
| 2003/0235187 A1 | * | 12/2003 | Iwama et al. | 370/352 |
| 2007/0254625 A1 | * | 11/2007 | Edge | 455/404.1 |
| 2010/0220716 A1 | | 9/2010 | O'Neill | |
| 2012/0250650 A1 | | 10/2012 | Brombal et al. | |

OTHER PUBLICATIONS

Camarillo et al.; Integration of Resource Management and SIP; Network Working Group Request for Comments: 3312; Oct. 2002; http://tools.ieft.org/pdf/rfc3312.pdf.

* cited by examiner

*Primary Examiner* — Randohi Serrao
(74) *Attorney, Agent, or Firm* — P. Su (57) ABSTRACT

In one embodiment, a method includes obtaining a request from a first endpoint to establish a session, determining whether a resource reservation may be established post-ring, and identifying a second endpoint to establish the resource reservation post-ring when it is determined that the resource reservation may be established post-ring. The method also includes notifying the second endpoint of the request and ringing the second endpoint. Notifying the second endpoint of the request includes notifying the second endpoint that the resource reservation may be established post-ring.

21 Claims, 8 Drawing Sheets

METHOD AND APPARATUS FOR SIGNALING POST-RING RESERVATIONS

The disclosure relates generally to network communications and, more particularly, to enabling a post-dial or post-answer initiation of one or more network bandwidth reservations by using a protocol such as a Resource Reservation Protocol (RSVP) reservations to be processed efficiently by a system in which multiple lines may ring.

BACKGROUND

Resource Reservation Protocol (RSVP) is a protocol, i.e., a transport layer protocol as defined in Request for Comments (RFC) 2205 which may be found at http://www.rfc-editor.org/rfc/rfc2205.txt, designed to allow an application to reserve resources across a network for a given data flow. A data flow is typically constrained in scope to a 5-tuple identification that includes a source address, a destination address, a source port, a destination port, and a transport protocol.

Within the context of realtime video and video communications, RSVP reservations are typically established pre-ring, i.e., before a phone associated with a potential answering agent rings. In other words, a call request that specifically offers or requires in call signaling messages establishing a reservation for a call generally causes a reservation to be established, e.g., by a call center server, prior to an agent answering the call, and/or prior to media being sent to the agent. When multiple agents may be eligible to answer a call, reservations between a caller and each of the multiple agents are attempted prior to any of the agents answering the call. For example, the phones of the agents generally do not ring until after reservations associated with a call are established. When reservations are established between a caller and each call agent that may potentially answer a call, bandwidth which may be used for other calls is unnecessarily reserved.

RFC 3312, entitled "Integration of Resource Management and Session Integration Protocol (SIP)" (hereinafter, "RFC 3312"), describes a method that allows for reservation establishment. According to RFC 3312, each device that may be called receives a SIP offer from a calling device, i.e., a caller, and responds to the calling device with another SIP message, e.g., an answer. The answer includes an Internet Protocol (IP) address, port information, and status information relating to a desired reservation. SIP signaling becomes relatively complicated when multiple devices that may be called are involved. Each device that may be called exchanges signaling messages before a call may be answered by one device, and each of the signaling message are processed, in turn, by elements in a signaling path as well as by a calling device.

BRIEF DESCRIPTION OF THE DRAWINGS

The disclosure will be readily understood by the following detailed description in conjunction with the accompanying drawings in which.

DESCRIPTION OF EXAMPLE EMBODIMENTS

General Overview

According to one aspect, a method includes obtaining a request from a first endpoint to establish a session, determining whether a resource reservation may be established post-ring, and identifying a second endpoint to establish the resource reservation post-ring when it is determined that the resource reservation may be established post-ring. The method also includes notifying at least the second endpoint of the request and ringing at least the second endpoint. Notifying the second endpoint of the request includes notifying the agent that the resource reservation may be established post-ring. In one embodiment, a first endpoint is associated with a caller and a second endpoint is associated with an agent of a call center system. It should be appreciated that it may be possible for a caller to determine whether a callee is capable of supporting reservations established post-ring. In one embodiment, the second endpoint is identified after notifying at least the second endpoint of the request and ringing at least the second endpoint of the request.

According to another aspect, a method includes accepting a request that indicates that a session is to be established with a first party. The method also includes determining whether the request indicates that a resource reservation associated with the request is to be established after accepting the request and, if the request indicates that the resource reservation is to be established after accepting the request, initiating the resource reservation.

Description

A reservation is the finite, but possibly variable bandwidth, allocation of networking resources between devices for a specific data flow. Networking devices on which an allocation may be reserved include, but are not limited to including, routers, switches, and gateways. A reservation may be made through the implementation of any suitable bandwidth signaling protocol that allows resources to be reserved, e.g., a Resource Reservation Protocol (RSVP). RSVP is a network-layer protocol that enables applications to reserve resources for data flows in order to obtain a desired or otherwise specified Quality of Service (QoS). Reservations may be reserved between endpoints. In RSVP, a data flow is typically a sequence of packets in which each packet may have the same source address and the same destination address. RSVP generally defines a "session" to be a data flow with a particular destination and transport-layer protocol.

By allowing Session Initiation Protocol (SIP) signaling to process a single media or multimedia call such that a reservation for the call is attempted either just after an INVITE message is processed at a called device or just after SIP signaling sets up the call, the efficiency with which a reservation is made may be enhanced. When a call is made to a call center such that substantially only an agent that answers the call sets up a reservation, e.g., sends an RSVP PATH message, the need to set up multiple reservations relating to each agent that may potentially answer the call is substantially eliminated. Thus, resources may be utilized in an efficient manner.

A post-dial or post-answer initiation of one or more network bandwidth reservations, e.g., by using RSVP, may be enabled for call types including, but not limited to including, audio media and/or video media flows. In general, when a call is requested or signaled, a reservation protocol may initiate a reservation request after a called endpoint rings, or a user on the called device answers the call request. That is, when a call to a second endpoint from a first endpoint is signaled, a reservation protocol such as RSVP may initiate a reservation request after a second endpoint rings, or a user associated with the second endpoint effectively answers the call.

Figure 1:
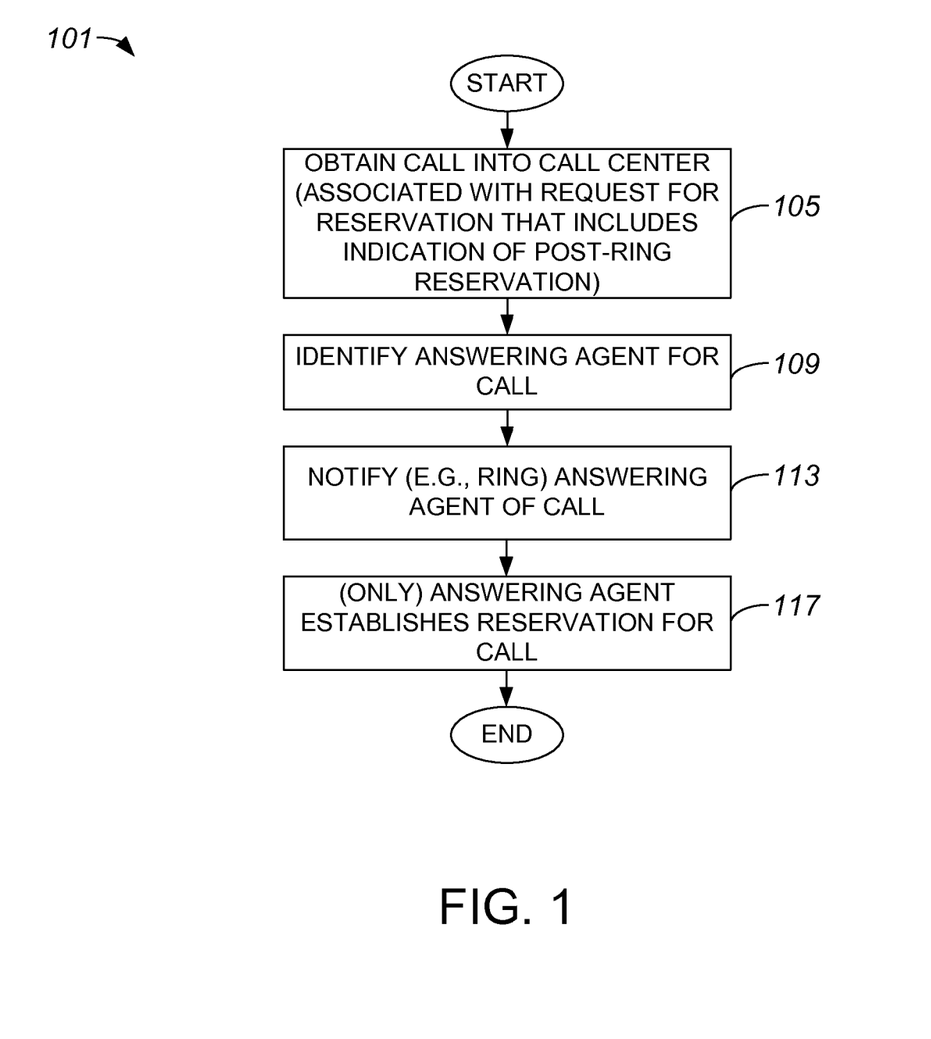
FIG. 1 is a process flow diagram which illustrates a method of processing a call that signals a post-ring reservation in accordance with an embodiment.

Referring initially to FIG. 1, a method of processing a call that signals a post-ring resource reservation will be described in accordance with an embodiment. A method 101 of processing a call begins at step 105 in which a call into a call center is obtained, e.g., by a call center server. It should be appreciated that the call may generally be directed to any number of agents in parallel. The call is generally obtained, e.g., received, from a caller or, more generally, a first endpoint. In the described embodiment, the call is associated with a request for a resource reservation that includes an indication of a post-ring reservation, a post-answer reservation, or generally a "post-condition." That is, the request for a reservation associated with the call indicates that the reservation may be established after a called device or agent is notified of a call.

Once a call into a call center is obtained, an answering agent for the call is identified in step 109. A call center server may, for example, identify a single agent to accept the call, e.g., a single agent to "ring" out of any number of agents who would otherwise be suitable for attempting to accept the call. After the answering agent, e.g., a second endpoint, is identified, the answering agent is notified of the call in step 113, e.g., by a ringing phone associated with the answering agent. It should be appreciated that any suitable method may generally be used to notify an answering agent of the call.

In step 117, the answering agent establishes a reservation for the call, i.e., reserves resources such as bandwidth for use with respect to the call. The reservation is established by the answering agent after the answering agent is notified of the call, e.g., when the agent is "rung" by a ringing phone. In one embodiment, only the answering agent, and no other agents associated with a call center, establishes a reservation that corresponds to the call. A reservation may be established by the answering agent after the answering agent answers the call. The method of processing a call is completed after the answering agent establishes a reservation.

It should be appreciated that a reservation may be established after ringing an answering agent, e.g., the agent identified in step 109 of FIG. 1. Alternatively, a reservation may be established after an agent answers the call, in which case the agent identified in step 109 of FIG. 1 may be identified after the agent answers the call. In other words, a reservation may be established substantially immediately after a single called device is rung, or after one of multiple lines answers a call.

Information which indicates to an answering agent that a resource reservation may be made with respect to a session or a call after the answering agent has been rung may be communicated to the answering agent as an attribute. As will be appreciated by those skilled in the art, Session Description Protocol (SDP) describes multimedia sessions for purposes of session announcement, session invitation, and other forms of multimedia session initiation. SDP attributes allow SDP to be extended. Media level attributes are typically arranged to provide information about a specific media stream if a plurality of media streams contained within an SDP payload of a signaling message, e.g., a SIP signaling message. To communicate information arranged to indicate that a reservation may be established post-ring, media level SDP attributes for one or more media flows or lines are typically set to indicate that "post conditions" are expected for the one or more media flows. In other words, a flag may generally effectively be set with respect to an attribute of a media line, e.g., in an "m-line" or an "m=" line, to indicate that a resource reservation may be requested and established after an endpoint, e.g., a phone or an audio/video phone, associated with an answering agent is rung, e.g., post-ring.

Figure 2:
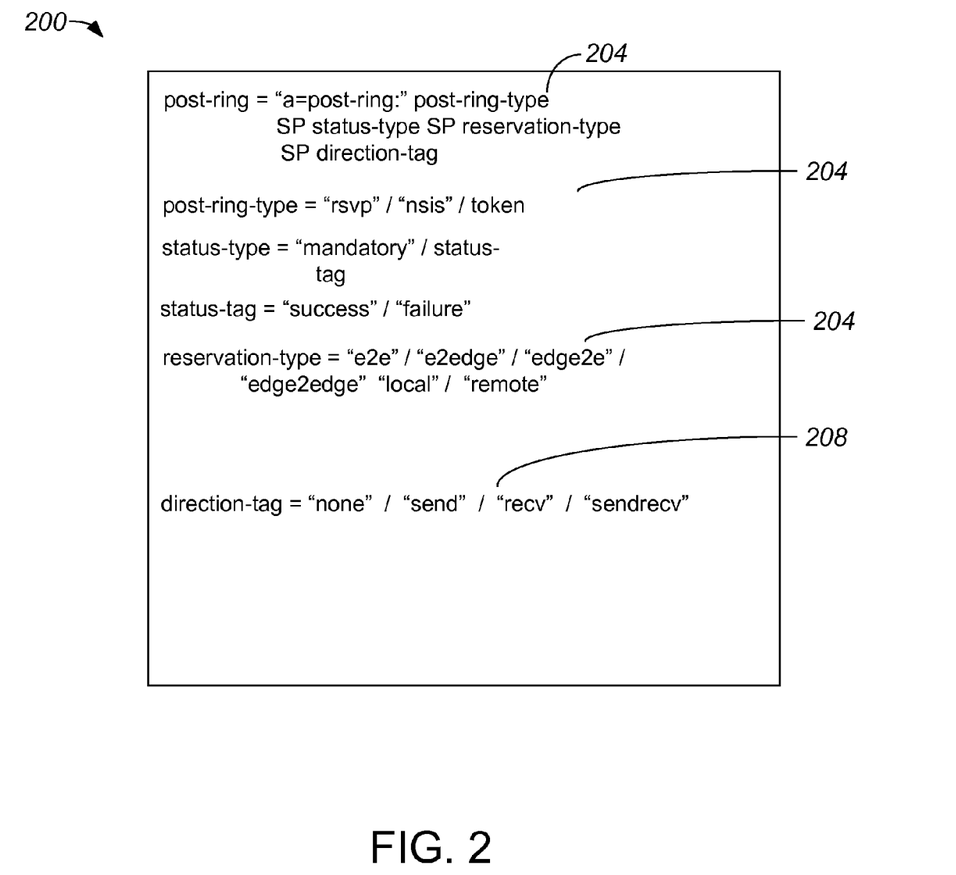
FIG. 2 is a diagrammatic representation of an example of media level Session Description Protocol (SDP) attributes for post-ring reservation establishment in accordance with an embodiment.

FIG. 2 is a diagrammatic representation of media level SDP attributes, expressed as an augmented Backus-Naur Form (ABNF), associated with post-ring reservation establishment in accordance with an embodiment. As shown, media level SDP attributes 200 for post-ring reservation establishment associated with a session include, but are not limited to including, attributes associated with status and direction. Values 204, e.g., option-tags, associated with status may indicate post-ring conditions that specify that a reservation may be established post-ring. For example, values 204 which indicate that a reservation may be established post-ring may be a "post-ring-type" value.

As shown, a "post-ring" option-tag may include an "a=post-ring" attribute arranged to indicate a reservation-type, e.g., a reservation-type which indicates that a post-ring reservation is e2e in both directions. It should be appreciated, however, that a post-ring reservation is not limited to being e2e in both directions. If a recipient such as a callee or a receiving endpoint, does not understand a particular option-tag, the recipient will typically reject the extension associated with the option-tag.

As will be appreciated by those skilled in the art, RFC 3312, entitled "Integration of Resource Management and Session Integration Protocol (SIP)" (hereinafter, "RFC 3312"), defines an "optional" strength-tag 208. RFC 3312 is incorporated herein by reference in its entirety for all purposes. In one embodiment, optional strength-tag 208 may be arranged to provide an indication that an answering or user agent should attempt to provide a resource reservation, but that a session may continue whether or not a user agent is able to provide the resource reservation. Upon identifying optional strength-tag 208 as indicating that a resource reservation is to be attempted, an answering or user agent that understands optional strength-tag 208 may send a PATH message to establish a reservation post-ring. Alternatively, if an answering or user agent does not understand optional strength-tag 208 as indicating that a resource reservation is to be attempted, the answering agent may effectively ignore optional strength-tag 208.

Figure 3:
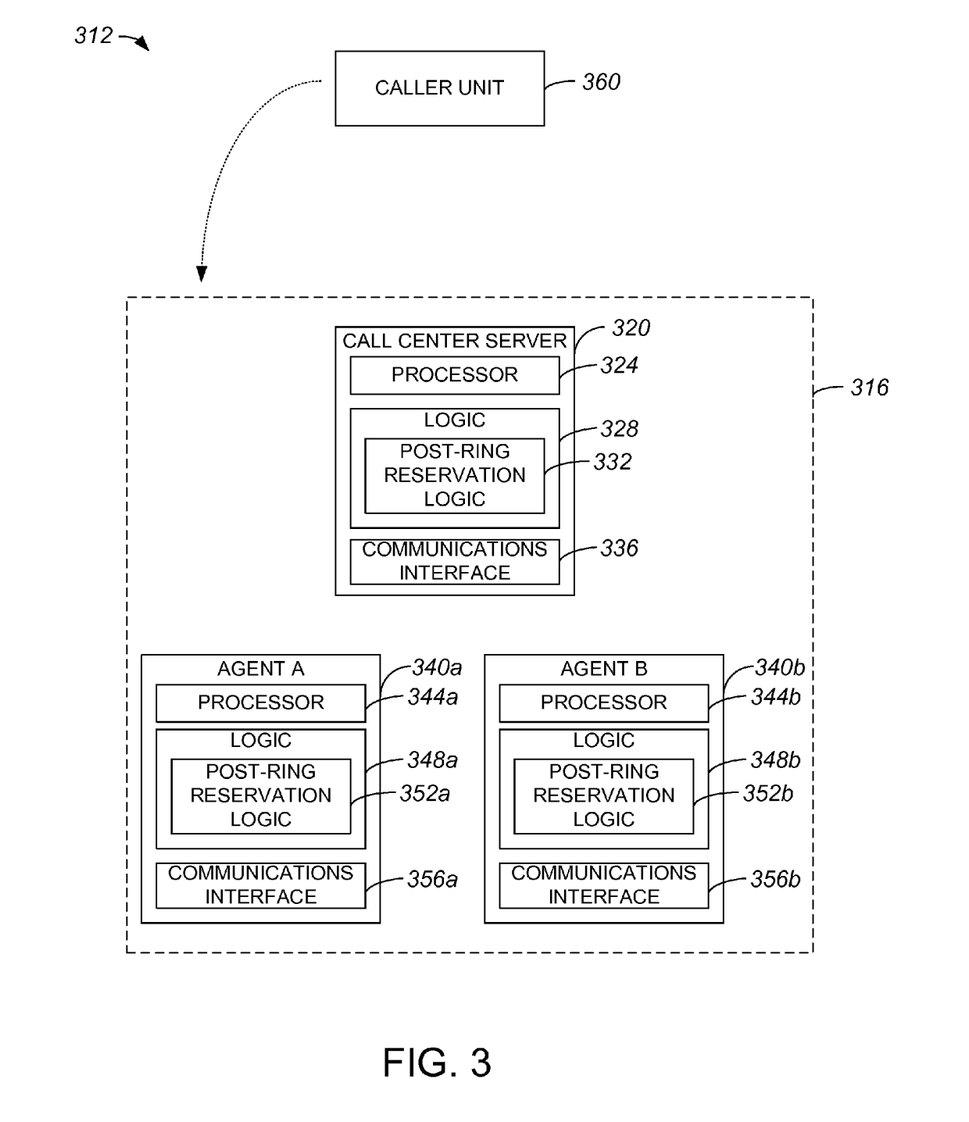
FIG. 3 is a diagrammatic representation of a system in which a post-ring reservation is signaled, e.g., using a post conditions indicator, in accordance with an embodiment.

FIG. 3 is a diagrammatic representation of a system in which a post-ring reservation is signaled, e.g., using a post conditions indicator such as a post-conditions tag, in accordance with an embodiment. A system 312 includes a call center 316 and a caller unit 360, e.g., a phone device, that is configured to call into call center 316. Call center 316 includes a call center server 320 and a plurality of caller or user agents 340a, 340b. Call center server 320 is arranged to obtain a call or session request from caller unit 360, and to effectively facilitate the establishment of contact between caller unit 360 and one of agents 340a, 340b.

Call center server 320 includes a processor 324, logic 328, and a communications interface 326. Processor 324 is arranged to execute logic 328, e.g., software logic that is embodied as computer program code on a tangible medium. Logic 328 generally includes software logic and hardware logic. Communications interface 336 is arranged to communicate with caller unit 360 and agents 340a, 340b to exchange information, e.g., to exchange information related to a call or session request. In general, communications interface 336 may include at least one input/output port that allows call center server 320 to communicate with caller unit 360.

Logic 328 is arranged to support a call from caller unit 360, and to identify and/or to process SDP attributes associated with the call. Post-ring reservation logic 332 is configured to support an indication which indicates that a reservation essentially associated with a call is generally not required before an agent 340a, 340b effectively accepts the call from caller unit 360. In one embodiment, post-ring reservation logic 332 indicates that an answering agent selected from agents 340a, 340b is to establish a reservation corresponding to a request from caller unit 360 and the reservation may be established after the answering agent has been rung, e.g., established post-ring.

Agent 340a includes a processor 344a, logic 348a, and a communications interface 356a. Processor 344a is arranged to execute logic 348a, e.g., software logic that is embodied as computer program code on a tangible medium. It should be appreciated that logic 348a generally includes software logic and hardware logic. Communications interface 356a is arranged to communicate with caller unit 360 and call center server 320 to exchange information. In general, communications interface 356a may include at least one input/output port that supports communications over a network.

Logic 348a is arranged to support a session or a call, and to identify and/or to process SDP attributes associated with the call. Post-ring reservation logic 352a is configured to support an indication which indicates that a reservation essentially associated with a call is generally not required before agent 340 has been rung or otherwise notified of the call. Post-ring reservation logic 352a is configured to enable agent 340a to identify when agent 340a is an answering agent, and to reserve resources when agent 340a is identified as the answering agent. Generally, post-ring reservation logic 352 is configured to identify a post conditions SDP in a received message, and to transmit a message that includes a post conditions SDP. It should be appreciated that when agent 340a is identified as the answering agent, agent 340a is rung prior to agent 340a establishing a resource reservation, i.e., agent 340a establishes a reservation post-ring Agent 340b includes a processor 344b, logic 348b which includes post-ring reservation logic 352a, and a communications interface 356a. In the embodiment as shown, agent 340b is configured similarly to agent 340a.

Figure 4:
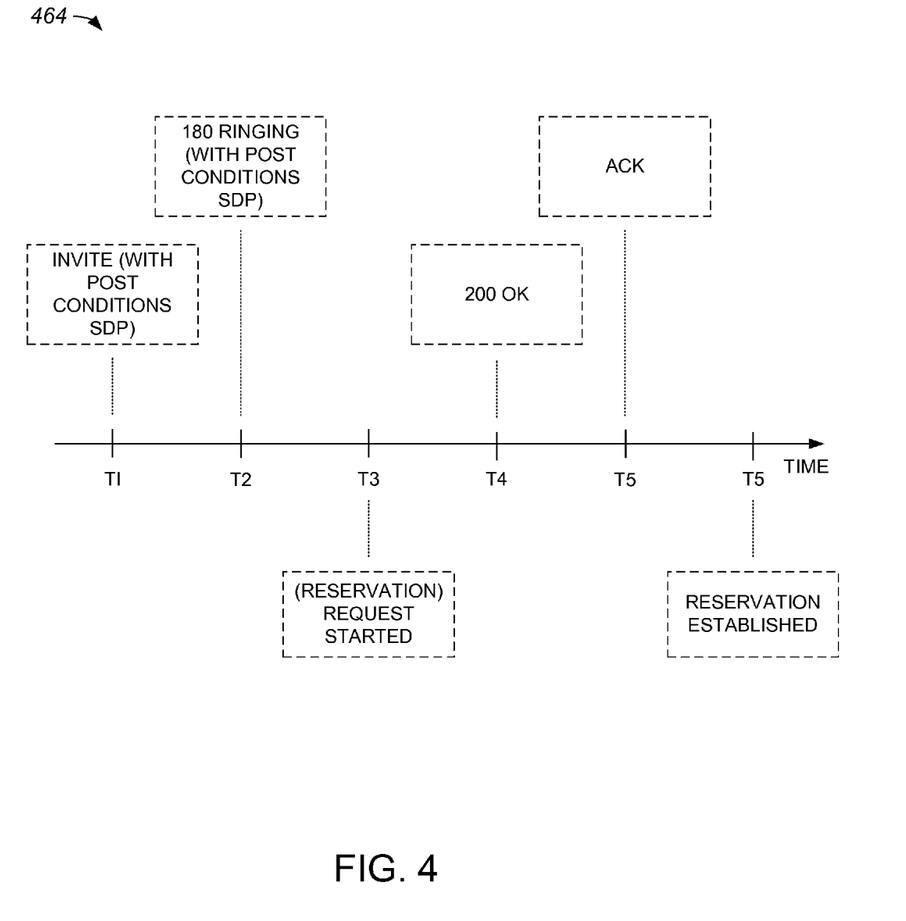
FIG. 4 is a diagrammatic representation of a timeline in which a call that signals post conditions is established in accordance with a first embodiment.

In one embodiment, a post conditions SDP may be included in an INVITE message and in a 180 Ringing message. FIG. 4 is a diagrammatic representation of a timeline in which a call that signals post conditions is established in accordance with an embodiment in which an INVITE message and a 180 Ringing message include a post conditions SDP. As shown on a timeline 464, at a time T1, an INVITE message that includes a post conditions SDP is effectively issued, e.g., sent, by a caller. At a time T2, upon becoming aware of the INVITE message, a 180 Ringing message is sent by a callee, e.g., called device or agent, to the caller. The 180 Ringing message includes a post conditions SDP.

After sending the 180 Ringing message, the callee initiates a reservation request at a time T3. Then, at a time T4, the callee may issue a 200 OK response message to the caller acknowledging that the callee has accepted the call in response to the INVITE message. It should be appreciated, however, that a callee may initiate or otherwise issue a reservation even after T4. An ACK message may be sent by the caller to the callee at a time T5, effectively acknowledging receipt of the 200 OK response message transmitted at time T4. In the embodiment as shown, a reservation is established by the callee at a time T5.

Figure 5:
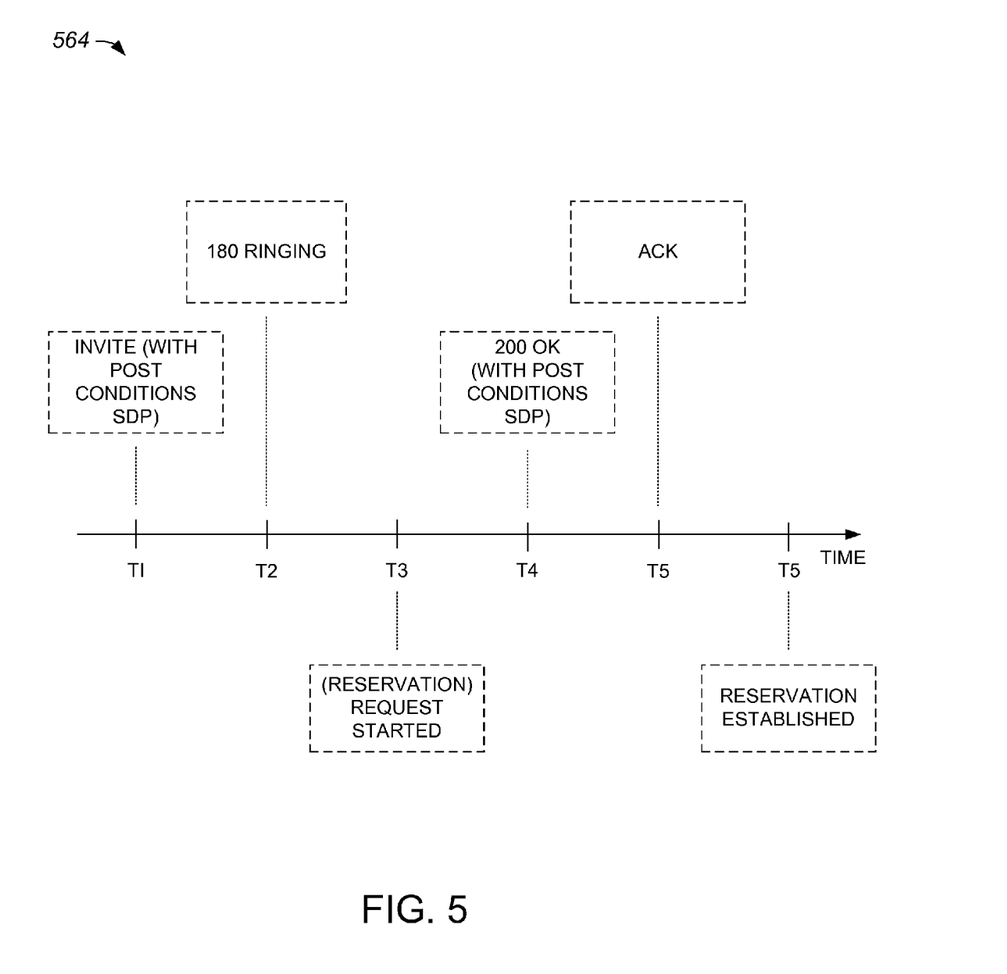
FIG. 5 is a diagrammatic representation of a timeline in which a call that signals post conditions is established in accordance with a second embodiment.

It should be appreciated that in lieu of, or in addition to, including a post conditions SDP in a 180 Ringing message, a post conditions SDP is generally included in a 200 OK response message. In one embodiment, while a post conditions SDP may effectively be optional in a 180 Ringing message, a post conditions SDP is included in a 200 OK response message. FIG. 5 is a diagrammatic representation of a timeline in which a call that signals post conditions is established in accordance with an embodiment in which an INVITE message and a 200 OK response message include a post conditions SDP. As shown on a timeline 564, at a time T1, an INVITE message that includes a post conditions SDP is effectively transmitted by a caller. At a time T2, upon becoming aware of the INVITE message, a 180 Ringing message is sent by a callee to the caller.

After sending the 180 Ringing message, the callee initiates a reservation request at a time T3, in one embodiment. Then, at a time T4, the callee may issue a 200 OK response message to the caller acknowledging that the callee has accepted the call in response to the INVITE message. The 200 OK response message, in the described embodiment, includes a post conditions SDP. The caller may send an ACK message to the callee at a time T5, effectively acknowledging receipt of the 200 OK response message transmitted at time T4. The reservation is established by the callee at a time T5.

Figure 6:
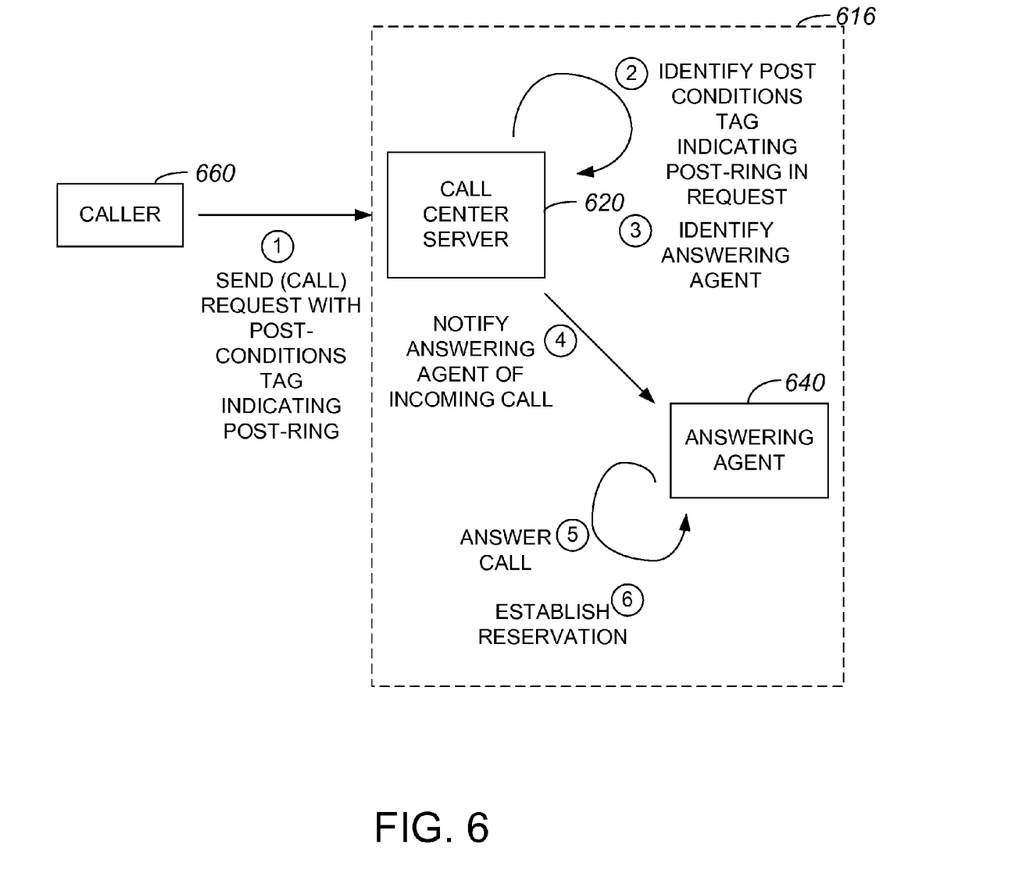
FIG. 6 is a diagrammatic representation of a process flow associated with processing a call request that signals post conditions in accordance with an embodiment.

With reference to FIG. 6, a method of processing a call request that signals post conditions will be described in accordance with an embodiment. A caller 660, e.g., a calling device, sends a call or session request to a call center 616 or, more specifically, a call center server 620 in an attempt to establish contact with an agent, e.g., answering agent 640, of call center 616. The call request sent by caller 660 includes a post-conditions tag arranged to indicate that a reservation may be established post-ring. Such a post-conditions tag may be implemented as a post conditions SDP, as mentioned above.

Call center server 620, upon receiving a request with a post-conditions tag from caller 660, identifies the post-conditions tag. That is, call center server 620 determines that a reservation associated with the request may be established by an agent, e.g., answering agent 640, after the agent is notified of the request. As such, call center server 620 identifies answering agent 640 as being suitable for servicing the request obtained from caller 660.

Once answering agent 640 is identified, call center server 620 notifies answering agent 640 of the call or request obtained from caller 660. As discussed above, answering agent 640 may be notified of the call by ringing, although answer agent 640 is not limited to being notified of the call by ringing. After answering agent 640 answers the call, answering agent 640 establishes a reservation associated with the call. In other words, after answering agent 640 effectively accepts the request, answering agent 640 may establish a reservation, e.g., send a PATH message.

As previously mentioned, messages associated with a SIP protocol may be modified by changing an SDP attribute to indicate a post-condition, e.g., that a reservation is not necessary prior to notifying an answering agent of a call. Messages including, but not limited to including, an INVITE message, a 200 OK message, an ACK message, and a 180 Ringing message may each be arranged to indicate a post-condition.

Figure 7:
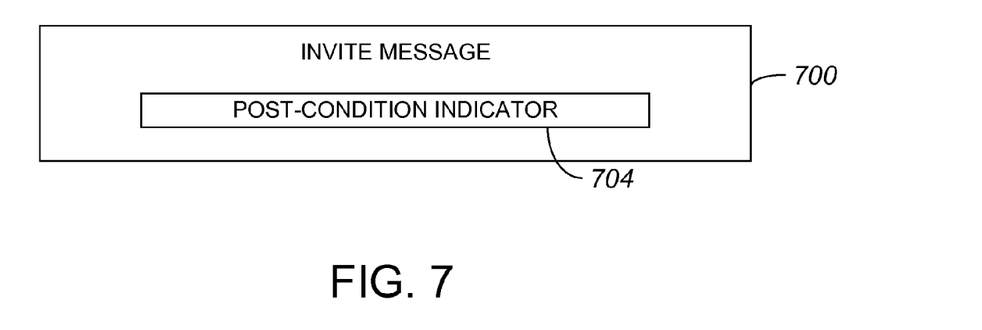
FIG. 7 is a diagrammatic representation of an INVITE message in accordance with an embodiment.

FIG. 7 is a diagrammatic representation of an INVITE message in accordance with an embodiment. An INVITE message 700 is generally a SIP message that is configured to cause a SIP device, e.g., a SIP phone, to be notified of an incoming call, e.g., by ringing. INVITE message 700 includes a post-condition indicator 704. That is, INVITE message 700 includes a post-condition SDP that is arranged to indicate that a reservation is to be established after a SIP device is notified of an incoming call, or that it is effectively not necessary to establish a reservation prior to notifying a SIP device of an incoming call. Post-condition indicator 704 may be associated with an "a=curr" line in SDP, or may effectively be an option-tag that is generally arranged to indicate that a reservation is desired, but that the reservation is effectively not needed until an answering agent or a called party is notified of an incoming call. It should be appreciated that the use of an option-tag is optional. In one embodiment, an option-tag may be included in an INVITE message.

Figure 8:
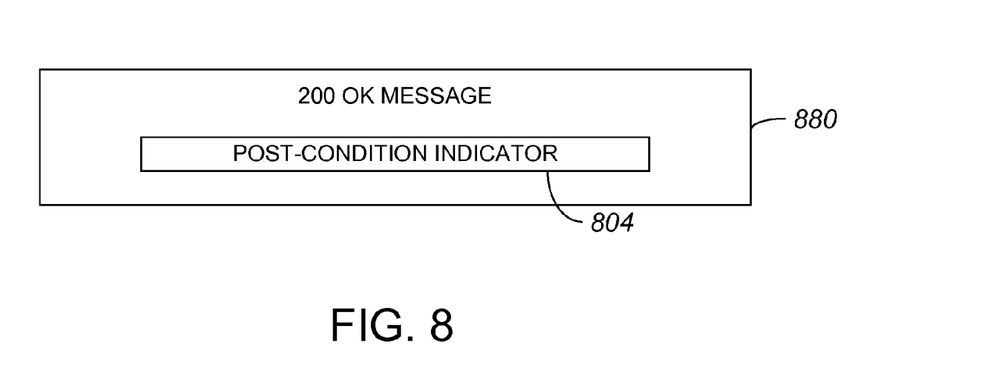
FIG. 8 is a diagrammatic representation of a 200 OK message in accordance with an embodiment.

FIG. 8 is a diagrammatic representation of a 200 OK message in accordance with an embodiment. A 200 OK message 880 is generally a SIP message that indicates that a request has succeeded. 200 OK message 880, in the described embodiment, includes a post-condition indicator 804 that is arranged to indicate that a reservation is to be established after a SIP device is notified of an incoming call, or that it is effectively not necessary to establish a reservation prior to notifying a SIP device of an incoming call.

Figure 9:
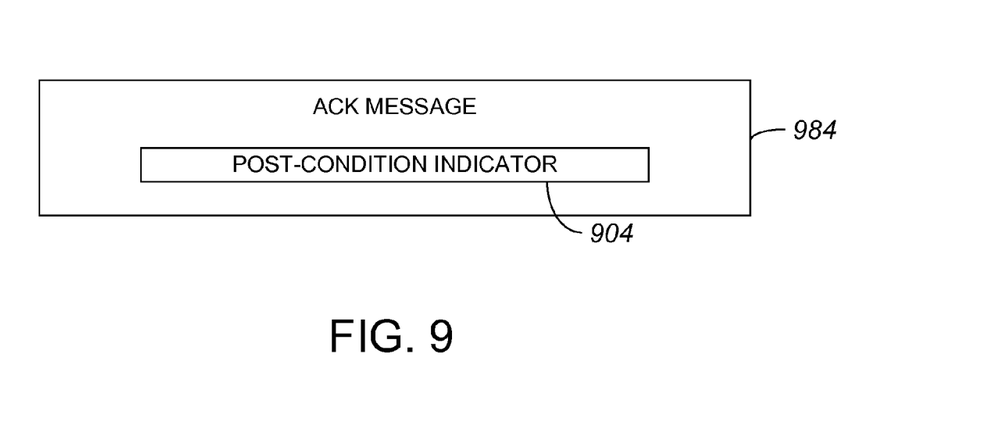
FIG. 9 is a diagrammatic representation of an ACK message in accordance with an embodiment.

FIG. 9 is a diagrammatic representation of an ACK message in accordance with an embodiment. An ACK message 984 is generally a SIP message that is arranged to acknowledge the receipt of a message or command. ACK message 984, as shown, includes a post-condition indicator 804 that is arranged to indicate that a reservation is to be established after a SIP device is notified of an incoming call, or that it is effectively not necessary to establish a reservation prior to notifying a SIP device of an incoming call.

Figure 10:
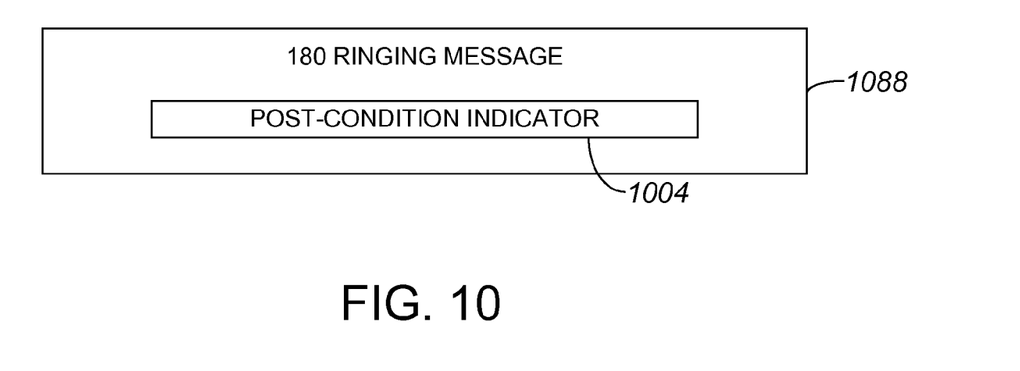
FIG. 10 is a diagrammatic representation of a 180 Ringing message in accordance with an embodiment.

FIG. 10 is a diagrammatic representation of a 180 Ringing message in accordance with an embodiment. A 180 Ringing message 1088 is a SIP message configured to indicate that a called device, e.g., a called agent, is currently being notified of a call, e.g., by ringing. Typically, 180 Ringing message 1088 is sent by a called device to a caller to indicate that the called device is ringing. 180 Ringing message 1088, in the described embodiment, includes a post-condition indicator 1004 that is arranged to indicate that a reservation is to be established after a SIP device is notified of an incoming call, or that it is effectively not necessary to establish a reservation prior to notifying a SIP device of an incoming call.

Although only a few embodiments have been described in this disclosure, it should be understood that the disclosure may be embodied in many other specific forms without departing from the spirit or the scope of the present disclosure. By way of example, although a post-conditions option-tag has been described as being suitable for use in allowing a post-ring reservation to be signaled, an option-tag that allows a post-ring reservation to be signaled is not limited to being a post-conditions option-tag. An option-tag that signals a post-ring reservation may be, but is not limited to being, a post-conditions option-tag, a post-ring option-tag, and/or an after-ring option-tag.

While the disclosure has generally been described in the context of a call center, it should be appreciated that the embodiments of the disclosure are not limited to being implemented with respect to a call center. In general, the embodiments of the disclosure may be implemented with respect to any endpoint that calls another endpoint. Further, though a reservation protocol has generally been described as being RSVP, any suitable reservation protocol may be used without departing from the spirit or the scope of the disclosure. Other suitable reservation protocols may include, but are not limited to including, Next Steps in Signaling (NSIS) and Network Layer Signaling (NLS).

In general, establishing a resource reservation post-ring may involve establishing a resource reservation at any time after ringing an endpoint, e.g., a callee. By way of example, a post-ring reservation may be a post-answer reservation, as a reservation established after a callee answers a call is also established after the callee is rung.

In one embodiment, an answering agent may attempt to provide a resource reservation pre-ring, or prior to answering a call, in response to a request that includes a post-conditions tag. However, the answering agent may answer the call even if the answering agent is not successful with providing a resource reservation pre-ring, and the answering agent may instead establish a reservation after answering the call. In some local configurations, however, if a post-condition reservation fails, a call does not fail. Rather, the call may be moved into a best effort or otherwise non-reservation status, allowing a callee and a caller to communicate if there are sufficient bandwidth resources in the network at the time of the call.

If an answering agent is not able to establish a reservation after answering a call, the call may be terminated, although it should be appreciated that the call may not necessarily be terminated. Alternatively, the answering agent may continue to attempt to establish a reservation until success is achieved, or the answering agent may continue to attempt to establish a reservation for a predetermined amount of time. In one embodiment, a PATH towards a user agent client (UAC) which is initiated post-ring may initiate the establishment of a reservation. If a reservation is not established, SIP servers may be updated to indicate that a reservation has not been established. It should be understood that a callee may generally assume that until he or she obtains an indication that a reservation is successful, no reservation has been successfully made. A caller may also generally assume that until he or she obtains an indication that a reservation is successful, no reservation has been successfully made. If an answering agent does not understand an option-tag that indicates a post-condition or that a reservation is to be established post-ring, then the answering agent my reject the option-tag as a bad extension. That is, the answering agent may effectively ignore the option-tag. If one or more option-tags in SIP is set as a required feature but may not be accommodated, a SIP request is rejected before establishment.

It should be appreciated that once a caller effectively receives a RESV message from an answering or user agent, the caller may send an UPDATE message indicating that a reservation was successful. Such an UPDATE message may be transmitted to servers and/or an answering agent.

The embodiments may be implemented as hardware and/or software logic embodied in a tangible medium that, when executed, e.g., by a processing system associated with a host device and/or a headset, is operable to perform the various methods and processes described above. That is, the logic may be embodied as physical arrangements, modules, or components. A tangible medium may be substantially any suitable physical, computer-readable medium that is capable of storing logic which may be executed, e.g., by a processing system such as a computer system, to perform methods and functions associated with the embodiments. Such computer-readable media may include, but are not limited to including, physical storage and/or memory devices. Executable logic may include code devices, computer program code, and/or executable computer commands or instructions that may be embodied on computer-readable media.

It should be appreciated that a computer-readable medium, or a machine-readable medium, may include transitory embodiments and/or non-transitory embodiments, e.g., signals or signals embodied in carrier waves. That is, a computer-readable medium may be associated with non-transitory tangible media and transitory propagating signals.

The steps associated with the methods of the present disclosure may vary widely. Steps may be added, removed, altered, combined, and reordered without departing from the spirit of the scope of the present disclosure. Therefore, the present examples are to be considered as illustrative and not restrictive, and the examples is not to be limited to the details given herein, but may be modified within the scope of the appended claims.

What is claimed is:

1. A method comprising:
   obtaining a request, at a call center server, from a first endpoint to establish a session;
   determining, at the call center server, whether a resource reservation is to be established post-ring, wherein determining whether a resource reservation is to be established post-ring includes determining whether the resource reservation is to be established after a second endpoint is notified of the request;
   identifying the second endpoint to establish the resource reservation post-ring when it is determined that the resource reservation may be established post-ring;
   notifying at least the second endpoint of the request, wherein notifying the second endpoint of the request includes the call center server notifying the second endpoint that the resource reservation is to be established post-ring; and
   ringing at least the second endpoint, wherein the call center server rings at least the second endpoint.

2. The method of claim 1 wherein the first endpoint is associated with a caller and the second endpoint is associated with a callee, and wherein determining whether to establish the resource reservation post-ring includes determining whether to establish the resource reservation post-answer.

3. The method of claim 2 wherein the callee is notified of the request in an INVITE message, wherein the INVITE message includes a Session Description Protocol (SDP) attribute arranged to indicate that the resource reservation may be established post-ring by the callee using the second endpoint.

4. The method of claim 3 wherein the SDP attribute indicates that the resource reservation may be initiated by the callee after ringing the callee.

5. The method of claim 2 wherein notifying the callee that the resource reservation may be established post-ring includes notifying the callee that the callee is to establish the reservation using the second endpoint after accepting the request.

6. The method of claim 1 wherein the second endpoint is one of a plurality of called endpoints, the method further including:
   notifying the plurality of called endpoints of the request.

7. Logic embodied in a tangible, non-transitory computer-readable medium, when executed, configured to:
   obtain a request from a first endpoint to establish a session;
   determine whether a resource reservation is to be established post-ring, wherein determining whether a resource reservation is to be established post-ring includes determining whether the resource reservation is to be established by a second endpoint after the second endpoint is notified of the request;
   identify a second endpoint to establish the resource reservation post-ring when it is determined that the resource reservation may be established post-ring;
   notify at least the second endpoint of the request, wherein the logic configured to notify the second endpoint of the request is operable to notify the second endpoint that the resource reservation is to be established post-ring; and
   ring at least the second endpoint.

8. The logic of claim 7 wherein the first endpoint is a caller and the second endpoint is a callee, and wherein the logic operable to determine whether to establish the resource reservation post-ring is further operable to determine whether to establish the resource reservation post-answer.

9. The logic of claim 8 wherein the callee is notified of the request in an INVITE message, wherein the INVITE message includes a Session Description Protocol (SDP) attribute arranged to indicate that the resource reservation may be established post-ring.

10. The logic of claim 8 wherein the SDP attribute indicates that the resource reservation may be initiated by the callee after ringing the callee.

11. The logic of claim 8 wherein notifying the callee that the resource reservation may be established post-ring includes notifying the callee that the callee is to establish the reservation after accepting the request.

12. The logic of claim 8 wherein the logic is associated with a call center and the agent is one of a plurality of call center agents associated with the call center, and wherein the call center identifies the agent and notifies the agent of the request.

13. A method comprising:
   accepting a request provided by a call center server, wherein the request indicates that a session is to be established with a first party, the request being accepted by an answering agent, the answering agent being in communication with the call center server;
   determining whether the request indicates that a resource reservation associated with the request is to be established by the answering agent after accepting the request; and
   initiating the resource reservation if it is determined that the request indicates that the resource reservation is to be established after accepting the request, wherein the answering agent initiates the resource reservation, and wherein the request is an INVITE message, the INVITE message including a Session Description Protocol (SDP) attribute, the SDP attribute being arranged to indicate that the resource reservation may be established by the answering agent after accepting the request.

14. The method of claim 13 wherein initiating the resource reservation includes sending a Resource Reservation Protocol (RSVP) PATH message through a network.

15. The method of claim 13 further including:
sending at least one selected from a group including a 180 Ringing message that includes the SDP attribute and a 200 OK message that includes the SDP attribute.

16. The method of claim 13 wherein the answering agent associated with the call center accepts the request and initiates the resource reservation if it is determined that the request indicates that the resource reservation is to be established after accepting the request.

17. Logic embodied in a tangible, non-transitory computer-readable medium, when executed, configured to:
accept a request, wherein the request indicates that a session is to be established with a first party, wherein the request is accepted by an answering agent;
determine whether the request indicates that a resource reservation associated with the request is to be established by the answering agent after accepting the request; and
initiate the resource reservation if it is determined that the request indicates that the resource reservation is to be established by the answering agent after accepting the request wherein the request is an INVITE message, the INVITE message including a Session Description Protocol (SDP) attribute, the SDP attribute being arranged to indicate that the resource reservation may be established by the answering agent after accepting the request.

18. The logic of claim 17 wherein the logic configured to initiate the resource reservation is further configured to send a Resource Reservation Protocol (RSVP) PATH message through a network.

19. The logic of claim 17 further configured to:
send a 180 Ringing message and a 200 OK message, wherein the 200 OK message is sent after the resource reservation is initiated, wherein at least one of the 180 Ringing message and the 200 OK message includes the SDP attribute; and
establishing the resource reservation after sending the 200 OK message.

20. The logic of claim 17 wherein the logic is included in the answering agent associated with a call center.

21. A method comprising:
obtaining a request, at a call center server, from a first endpoint to establish a session, the call center server being in communication with the first endpoint and at least a second endpoint, wherein the request is an INVITE message that includes a post-condition indicator arranged to indicate that a resource reservation is to be established after at least a second endpoint is notified of the request;
determining, at the call center server, whether a resource reservation is to be established post-ring, wherein determining whether a resource reservation is to be established post-ring includes determining whether the request includes the post-condition indicator; and
signaling between the first endpoint and the at least second endpoint when it is determined that the resource reservation is to be established post-ring, wherein signaling between the first endpoint and the at least second endpoint allows the resource reservation to be established for at least one media flow between the first endpoint and the at least second endpoint after the at least second endpoint is notified of the request.

* * * * *